US005728638A

United States Patent [19]

Strange et al.

[11] Patent Number: 5,728,638

[45] Date of Patent: Mar. 17, 1998

[54] METAL/CERAMIC COMPOSITES CONTAINING INERT METALS

[75] Inventors: Andrew C. Strange; Michael C. Breslin, both of Columbus, Ohio

[73] Assignee: BFD, Inc., Columbus, Ohio

[21] Appl. No.: 703,427

[22] Filed: Aug. 21, 1996

[51] Int. Cl.[6] .......................... C04B 35/10; C04B 35/46; C04B 35/50; C04B 35/58

[52] U.S. Cl. .......................... 501/127; 501/96.1; 501/104; 501/105; 501/119; 501/125; 501/126; 501/128; 501/133; 501/152; 501/153; 419/19; 419/47; 75/234; 75/235

[58] Field of Search .......................... 75/234, 235; 419/19, 419/47; 501/127, 126, 128, 105, 104, 119, 125, 133, 96, 152, 153, 96.1

[56] References Cited

U.S. PATENT DOCUMENTS

| | | | |
|---|---|---|---|
| 3,437,468 | 4/1969 | Seufert | 51/298 |
| 3,779,714 | 12/1973 | Nadkarni et al. | 75/235 |
| 3,973,977 | 8/1976 | Wilson | 106/62 |
| 4,673,435 | 6/1987 | Yamaguchi et al. | 75/235 |
| 4,847,220 | 7/1989 | Lesher et al. | 501/89 |
| 4,874,569 | 10/1989 | Kuszyk et al. | 264/60 |
| 4,885,131 | 12/1989 | Newkirk | 419/12 |
| 4,886,766 | 12/1989 | Dwivedi | 501/87 |
| 4,891,345 | 1/1990 | Nadkanni et al. | 501/155 |
| 4,923,832 | 5/1990 | Newkirk et al. | 501/128 |
| 4,935,055 | 6/1990 | Aghajanian et al. | 164/66.1 |
| 4,940,679 | 7/1990 | Claar et al. | 501/96 |
| 4,956,319 | 9/1990 | Dwivedi et al. | 501/127 |
| 4,956,338 | 9/1990 | Rapp et al. | 505/1 |
| 4,957,779 | 9/1990 | Irick et al. | 427/193 |
| 4,960,736 | 10/1990 | Luxzcz et al. | 501/127 |
| 5,214,011 | 5/1993 | Breslin | 501/127 |

OTHER PUBLICATIONS

Nagelberg, *Solid State Ionics*, "Growth Kinetics of $Al_2O_3$/Metal Composites From a Complex Aluminum Alloy", 32/33 (1989) pp. 783–788.

Breyal, *J. Am. Ceram. Soc.*, "Microstructure and Composition of Alumina/Aluminum Composites Made by Direct Oxidation of Aluminum", vol. 73 [9] pp. 2610–2614 (1990).

Newkirk et al., (preprint) *Ann. Conf. on Composites and Advanced Ceramic Materials*, "Preparation of Lanxide Ceramic Matrix Composites: Matrix Formation by the Directed Oxidation of Molten Metals", Jan. 1987.

Prabriputaloong et al., *J. Am. Ceram. Soc., "Reduction of $SiO_2$* by Molten Al", Apr. 1973 pp. 184–185.

Urquhart, *Advanced Materials and Processes*, "Molten Metals Sire MMCs, CMCs", Jul. 1991 pp. 25–29.

Schiroky et al., Gas Turbine and Aeroengine Congress and Exposition, "Ceramic Compositions for Gas Turbine Engines Via a New Process", Jun. 4–8 1989 Toronto Canada pp. 1–5.

Newkirk et al., *J. Mater. Res.* 1(1) Jan./Feb. 1986 "Formation of Lanxide™ Ceramic Composites Materials", pp. 81–89.

Brondyke, *J. Am. Ceram. Soc.*, "Effect of Molten Aluminum on Alumina–Silica Refractories", vol. 36(5) pp. 171–174 (1953).

Creber, et al. *Ceram. Eng. Sci. Proc.*, 9[7–8] pp. 975–982 (1988) "AlN Composite Growth by Nitridation of Aluminum Alloys".

Standage et al. *J. Am. Ceram. Soc.*, "Reaction Between Vitreous Silica and Molten Aluminum", vol. 50 No. 2 pp. 101–105 (1967 Feb.).

*Primary Examiner*—Melissa Bonner
*Attorney, Agent, or Firm*—Dennis H. Rainear

[57] ABSTRACT

The invention is directed to a non-vapor phase process for forming a metal/ceramic composite containing a relatively inert metal such as silver, copper, or nickel by the reaction of a reactive metal or metal alloy containing the inert metal, and a sacrificial ceramic preform. The resulting metal/ceramic composite is essentially the same shape and dimensions as the sacrificial ceramic preform, and exhibits improved physical and mechanical properties, including improved corrosion and wear resistance.

16 Claims, No Drawings

METAL/CERAMIC COMPOSITES CONTAINING INERT METALS

TECHNICAL FIELD

The invention is directed to a non-vapor phase process for forming a metal/ceramic composite containing a relatively inert metal such as silver, copper, or nickel by the reaction of a metal or metal alloy containing a reactive metal species and a relatively inert, less reactive metal species, and a sacrificial ceramic preform. The resulting metal/ceramic composite is essentially the same shape and dimensions as the sacrificial ceramic preform and exhibits improved properties such as but not limited to corrosion and wear resistance relative to the properties of metal-ceramic composites of the prior art.

BACKGROUND ART

The invention is an advancement of the invention described in U.S. Pat. No. 5,214,011, issued May 25, 1993 and commonly assigned with the present invention. The prior art U.S. Pat. No. 5,214,011, which is incorporated herein by reference, teaches a process wherein a molten metal or alloy is oxidized directly by a sacrificial ceramic preform which is immersed into the molten metal or alloy, wherein the preform serves as the oxidizer and also as the pattern or geometric form of the final composite article. The cation of the sacrificial ceramic preform is replaced by a metal ion and the preform shape is infiltrated by the metal or metal alloy, thus retaining the shape of the preform.

Except for U.S. Pat. No. 5,214,011, prior art processes for the fabrication of alumina/aluminum matrix composites suffer from the limitation in three dimensional growth which tends to restrict the shape of the resulting composite articles. In addition, except for the U.S. Pat. No. 5,214,011, prior art processes required gas phase reaction. But metal-ceramic articles produced by the conventional methods exhibit undesirable porosity, anisotropy and poor toughness for many applications.

There exists, therefore, a need for a metal/ceramic composite, wherein the composite exhibits an improved ability to tailor specific properties, such as hardness and toughness and improve wear and corrosion resistance. There also exists a need for a process for forming articles made from an improved metal/ceramic composite. Finally, it is desirable to obtain a reduction in the manufacturing and materials costs for metal/ceramic composites.

BRIEF DISCLOSURE OF THE INVENTION

The present invention relates to a process for the preparation of a metal/ceramic composite material, wherein a replacement (or displacement) reaction occurs to displace a cation of a ceramic preform with a reactive metal, such as aluminum. The present invention incorporates the infiltration and replacement reaction process technology taught in the U.S. Pat. No. 5,214,011 to prepare a novel metal/ceramic composite. However, it is surprisingly presented by the instant invention that the incorporation of at least one inert metal into the metallic phase of the metal/ceramic composite can significantly improve the resulting properties, including among others the corrosion and wear resistance. The present invention can also produce in a resulting composite microstructural changes, such as grain size refinement relative to grain sizes in conventional composites. It is also unexpected that the infiltration or displacement reaction still occurs with the large amount of inert metal present in the instant invention. The present invention presents an unexpected route to creating composites of a non-reactive or less reactive metal and a ceramic formed by a displacement reaction. Preferably, the inert metal or metals is or are present in the metal/ceramic composite in a major proportion relative to the amount of the reactive metal. "Metal/ceramic composite" herein is not meant to be limiting or to denote that one phase is necessarily the major component or the matrix phase. Thus, metal/ceramic composite and ceramic/metal composite can be used interchangeably in the present invention.

In this invention, the more reactive metal displaces silicon (or the analogous cation of the sacrificial ceramic preform as further defined herein) while the less reactive metal, either alone or with some of the more reactive metal, infiltrates the reaction-produced ceramic body. The less reactive metal may actually serve as a carrier, diluent or molten solvent to assist in the transport of the more reactive metal species.

More specifically, a sacrificial ceramic preform of desired shape is immersed in a bath of reactive molten metal or metal alloy. By "metal" herein is meant pure metal or metals, metal alloys, intermetallic compounds, and mixtures thereof. The molten metal or metal alloy may be referred to herein as the "reactive metal". Into or with this molten metal or molten metal alloy bath is about 40% to 98% by weight, and more preferably 70% to 95% by weight of at least one inert or relatively inert metal, with the remainder of the bath comprising the reactive metal. By "inert metal" herein is meant a metal which is not as strong an oxide former relative to the reactive metals described herein, i.e., relatively less reactive than the reactive metal in the specific reaction environment. Also, the "inert metals" herein are not necessarily inert in the conventional sense, but are relatively less reactive than the reactive metal(s) used in the present invention. Thus, the inert metal is more thermodynamically stable or kinetically inhibited in the presence of the ceramic preform than is the reactive metal species. We note that these "inert metals" may also form compounds that could make up the majority or minority of the metal phase which can be used to strengthen or improve the properties of the resulting composites. According to the present invention, useful inert metals herein can include copper, iron, cobalt, nickel, silver, gold, platinum, palladium, titanium, zinc, cadmium, tin, germanium and lead, and mixtures of two or more of these.

In one preferred embodiment, the minority species in the molten metal bath is the reactive metal aluminum and the majority species is an inert metal selected from copper, nickel, silver or a mixture of two or more thereof. Into this molten bath is immersed the sacrificial ceramic preform, whereby a displacement reaction occurs as taught in the U.S. Pat. No. 5,214,011, however, with the surprising benefit that the reaction forms an oxide based on the reactive metal (eg. alumina), while the less reactive metal or alloy infiltrates, resulting in the metal/ceramic composite material.

The sacrificial ceramic preform and the molten metal are preferably contacted such that there is direct and maximum surface contact between the preform, the inert metal(s) and the reactive molten metal. Because the oxidation reaction can be conducted within the preform or crucible and completely under the surface level of the molten metal, it is clear that a gas phase oxidant or an oxidizing atmosphere is not required in the present invention. This is quite different from the prior art and the Lanxide DIMOX process.

In another embodiment of the process of the present invention, a $SiO_2$-containing preform decomposes or at least partially decomposes at the elevated temperature of the reactive molten aluminum alloy to the extent necessary for the preform to serve as an oxidizer for the oxidation of the liquid metal in the molten aluminum bath to aluminum oxide. The other reaction product is silicon in solution. The silica-containing preform also serves the purpose of dictating the geometry of the final composite body as the aluminum from the molten alloy and aluminum oxide penetrate and replace the silica-containing preform, displacing the silicon atoms. The inert metal does not chemically react or oxidize but infiltrates the interconnected porosity present in the reacted ceramic body. The reaction product typically contains both interconnected alumina and interconnected alloy. In this manner was prepared a ceramic composite rod-shaped article by immersing a quartz preform in a molten aluminum alloy containing relatively inert copper.

In another embodiment of the present invention, a molten aluminum alloy containing a major portion of an inert metal such as copper, nickel, or silver is poured into a sacrificial ceramic crucible or receptacle which serves as the preform rather than immersing the preform in a molten alloy bath. As discussed above, the ceramic oxide (e.g. $SiO_2$) of the preform serves to both donate oxygen sufficient to oxidize or at least partially oxidize an amount of the aluminum metal in the molten alloy to aluminum oxide, and also as a model or pattern for the resulting article. The molten alloy containing the inert metal then conforms to the shape of the ceramic oxide crucible or receptacle, penetrates the crucible or receptacle, and the aluminum replaces the non-oxygen atoms in the preform with aluminum atoms forming aluminum oxide molecules, to produce the final ceramic-metal composite article. The inert metal is conveyed physically into the preform whereby the inert metal is incorporated into the final article without significant chemical reaction. The final article no longer contains the original ceramic oxide (such as silica) but is an aluminum/alumina/inert metal composite.

Any sacrificial ceramic preform which is less thermodynamically stable than is the oxide, nitride, carbide, or sulfide of the chosen reactive molten metal or molten metal alloy can be used to oxidize the reactive molten metal or molten alloy to thereby produce a metal/ceramic, or metal/ceramic oxide/inert metal composite, according to the present invention.

By "sacrificial ceramic preform" herein is meant the chemical sacrifice (i.e., chemical reduction) while retaining the macroscopic physical or geometric form, i.e., the chemical elements of the preform are sacrificed as the preform is reduced to thereby oxidize the molten metal to a metal oxide. The reduced preform components diffuse outwardly as a solute from the preform shape. The sacrificial ceramic preform can include, for example, an article or material comprising silica, mullite, zinc oxide (ZnO), copper oxides ($Cu_2O$ and CuO), chromium oxide ($Cr_2O_3$), nickel oxide (NiO), titania ($TiO_2$), titanium carbide (TiC), zirconia ($ZrO_2$), zirconium carbide (ZrC), zirconium nitride (ZrN), silicon nitride ($Si_3N_4$), silicon carbide (SiC), magnesium oxide (MgO), analogous sulfides and oxides, or mixtures thereof. Thus oxides, nitrides, sulfides, and carbides are all operative in the present invention.

The sacrificial ceramic preform can further contain whiskers, particulates, or fibers of one or more of the materials selected from the group consisting of silica, titania, zirconia, alumina, tungsten carbide, zircon, celsian, diamond, silicon nitride, and silicon carbide. Thus, for example, a silica glass preform containing SiC, alumina, or silicon nitride fibers, particulates, or whiskers can be used in the present invention. The fibers or whiskers may or may not be totally replaced by the metal/metal oxide depending on the reaction temperature and the nature of the fibers, particulates, or whiskers. Alternatively, the fibers, particulates, or whiskers can be retained in the resulting ceramic-metal composite article by utilizing a lower reaction temperature, or suitable alloying additions.

It is not critical to the present invention that the sacrificial ceramic preform be an oxide, such as silica, since it can also be any material able to react with the reactive molten metal to form a ceramic. Thus the ceramic formed can be an oxide, nitride, carbide, or sulfide of the molten metal. It is also not critical that the sacrificial ceramic preform be fully replaced by the metal and ceramic, since for some applications it may be desirable to retain an amount of porosity or preform or other ceramic such as silicon carbide or silicon nitride in the final composite. The amount of remaining ceramic from the preform can be controlled according to the present invention by controlling the reaction time and temperature. A reduction in the reaction time can produce articles with residual sacrificial ceramic preform in addition to the metal and metal oxide phases. However, metal/ceramic/inert metal composites prepared by the present invention exhibit increased hardness, often decreased porosity, and improved toughness as the sacrificial ceramic preform is replaced with metal and metal oxide.

In a preferred embodiment, the reactive molten metal is aluminum or an aluminum alloy. The molten aluminum alloy can be a material comprising one or more of the metals selected from the group consisting of iron, cobalt, magnesium, titanium, tantalum, tungsten, yttrium, niobium, zirconium, and hafnium, and mixtures thereof.

Thus, in one embodiment of the present invention is presented a non-vapor phase process for forming a metal/ceramic composite comprising the steps:

(a) mixing a reactive molten metal or molten metal alloy with at least one inert metal selected from the group consisting of copper, iron, cobalt, nickel, silver, gold, platinum, palladium, titanium zinc, cadmium, tin, germanium and lead to form a molten bath;

(b) immersing into the molten bath a sacrificial ceramic body, wherein the reactive molten metal or metal alloy is at a temperature above its melting point but below the softening point of the ceramic body, whereby a metal/ceramic composite article is formed containing the inert metal.

In another embodiment of the present invention is presented a metal/ceramic composite article which contains an inert metal that has infiltrated the interconnected porosity of the ceramic phase. The present invention can also produce in a resulting composite microstructural changes, such as grain size refinement relative to grain sizes in conventional composites. Thus, as the proportion of Cu increases, the resulting grain sizes decrease. By employing as a major proportion of the bath an inert metal or metals, and subsequently in the composite, the reactivity of the resulting composite toward oxidation, or corrosion and/or wear resistance, is dramatically improved by the present invention without a loss in toughness or hardness.

In yet another embodiment of the invention is a method for improving the wear resistance and also the corrosion resistance of a metal/ceramic composite article comprising preparing a metal/ceramic composite article by means of (a) mixing a reactive molten metal or molten metal alloy with at least one inert metal selected from the group consisting of copper, iron, cobalt, nickel, silver, gold, platinum, palladium, titanium, zinc, cadmium, tin, germanium and lead to form a molten bath; and (b) immersing into the molten bath a sacrificial ceramic body, wherein the reactive molten metal or metal alloy is at a temperature above its melting point but below the softening point of the ceramic body, whereby a metal/ceramic composite article is prepared containing an inert metal.

DETAILED DESCRIPTION OF INVENTION

In the process of the present invention, a sacrificial ceramic body or preform, such as silica, quartz, sand, wollastonite, mullite, silicate glass, fluorosilicate glass, fluoroborosilicate glass, aluminosilicate glass, calcium silicate glass, calcium aluminum silicate glass, calcium aluminum fluorosilicate glass, zinc oxide, copper oxides, chromium oxide, nickel oxide, titania, titanium carbide, magnesia, zirconia, zirconium carbide, zirconium nitride, silicon carbide, or silicon nitride, metal sulfides, metal oxides, or a mixture or combination thereof, is placed in contact with a mixture of an inert metal or metals and a reactive molten metal such as aluminum, iron, cobalt, an aluminum alloy, magnesium, titanium, tungsten, tantalum, yttrium, zirconium, hafnium or niobium, or a mixture thereof, at a temperature greater than the melting point of the metal, but less than the melting point or softening point of the sacrificial ceramic preform. The preform and the molten metal, into which has been mixed the inert metal or metals, are maintained in contact at the elevated temperature for a time sufficient to allow the preform to at least partially transform, and preferably fully transform, into a ceramic metal oxide body containing a metallic phase. It is preferred that the temperature of the reactive molten metal or alloy be above the melting point of the reactive metal or alloy. Any oxide source is operative herein if the molten reactive metal, such as for example, aluminum, is able to displace the cation therefrom, such as silicon, and thereby form, for example, $Al_2O_3$. Higher melting or softening point silicates or silicas are preferred, thus quartz, amorphous or polycrystalline silica and mullite are the most preferred silicas. Lower softening point silicas are less likely to maintain the desired shape. The sacrificial ceramic preform can also be an oxide, carbide, or nitride or mixture thereof.

According to the present invention, a reactive metal and relatively strong oxide former, A, is placed in an otherwise inert metal(s), C, which is not a strong oxide forming material. This mixture is reacted with a sacrificial ceramic preform $B_xO_y$ to form a new compound $A_wO_z$. In this context, O is an oxide in the generic sense, and can thus include nitrides, sulfides, carbides, and the like. Thus,

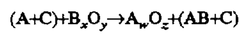

$$(A+C)+B_xO_y \rightarrow A_wO_z+(AB+C)$$

The reaction illustrates that the inert metal(s), C, does not chemically react with the other reactants, but rather is physically incorporated or infiltrated into the metal phase of the resulting composite. If the reaction of the specific reactants chosen is thermodynamically favored and the product oxide of the reaction is denser than the precursor, the precursor will react and the molten metal that surrounds the starting ceramic oxide will infiltrate the ceramic preform. One key aspect of the present invention is that A may be dilute in some other metal that has properties desired for incorporation in the final composite article.

$B_xO_y$ can be selected from a wide range of compounds including: silicon dioxide, titanium dioxide, magnesium oxide, silicon nitride, silicon carbide, titanium carbide, zinc oxide, nickel oxide, copper oxide, chromium oxide, zirconium dioxide, zirconium carbide, zirconium nitride, and mixture thereof such as mullite. Carbides, oxides, sulfides, and nitrides or reactive metals are all expected to be operative in the present invention. It is recognized that the resulting reduced metal, B, can react with the reactive molten metal, A, to form another compound.

The sacrificial preform body acts as an oxidizer of the reactive metal and also as a pattern for the shape of the final metal/ceramic composite article. The resulting metal/ceramic composite article contains two phases, the first a ceramic phase based on the reactive metal or metal alloy plus optionally the inert metal or metals, and the second a metal phase containing a mixture of the reactive metal and the inert metal or metals, one or both of which phases may be continuous. The ceramic phase produced may be an oxide, nitride, carbide, or sulfide depending on the nature of the starting preform body.

In the $SiO_2$/Al embodiment of the present invention, a molar volume reduction in the resulting ceramic component relative to the volume of the starting preform is achieved in the present invention. As the silica sacrificial ceramic preform is replaced by metal oxide, such as alumina, there is a significant volume contraction of the ceramic of approximately 25 volume per cent. The volume reduction is due to the $Al_2O_3$ or other metal oxide or ceramic products having smaller volume per mole of oxygen than $SiO_2$, or $TiO_2$, or $ZrO_2$ of the sacrificial ceramic preform. Therefore, the transformation product must have a smaller volume per mole of oxygen than the sacrificial ceramic preform compound. For the replacement of titanium in a sacrificial preform by aluminum, the volume reduction is about 9%. When the ceramic oxide, such as $SiO_2$, is brought into contact with the reactive molten metal, such as aluminum, the reaction starts immediately and the outer ceramic oxide layer is transformed into metal oxide, rejecting silicon, or titanium, or zirconium into the metal melt. It is known that there is a very high solubility for silicon in molten aluminum. Because there is a large decrease in solid volume upon transformation, large tensile stresses develop in the layer of metal oxide formed. Eventually the layer cracks, likely producing cracks in the ceramic oxide preform to which it is bonded. This permits the molten metal to reach deeper into the preform structure. Also, this cracking roughens the melt-ceramic oxide interface. This produces some channels in the reactive progression surface which allows reactive molten Al or other molten metal, and also the inert metal or metals to flow further inwardly. The inventors believe that the reaction is maintained and sustained by the continuous flow of molten metal through channels created by cracking of the transformation product. It is also possible that the reaction takes place by processes much like dissolution and re-precipitation without mechanical cracking occurring. This complicated three dimensional contraction and cracking leads to interconnected blocks of metal present. Reduced preform material such as elemental Si, Ti, or Zr travels or diffuses from the area of lower concentration in the molten metal. It is believed, but the inventor does not wish to be limited to the theory, that as the sacrificial ceramic preform is reduced, the reactive molten metal is oxidized to metal oxide and the reactive molten metal and inert metal flow through channels in the reaction product permitting the reaction to continue. This leaves reduced metal, such as silicon, titanium, or zirconium in solution which diffuses out into the bulk molten metal surrounding the preform.

Thus, self supporting ceramic composite bodies are produced by reactive progression of a parent metal as a solid state transformation into a sacrificial ceramic preform. The reactive progression typically results in a composite comprising an oxidation product (ceramic or metal oxide), an inert metal, and a residual metal.

In one embodiment of the present invention, a silica preform is immersed in a molten bath comprising 40% to 98%, and preferably 75% to 95%, by weight of a mixture of two inert metals selected from copper, nickel, and silver, wherein the remainder of the molten bath is a reactive metal, preferably but not limited to aluminum.

In another non-limiting example, the molten bath comprises a mixture of 5% to 70% by weight copper and 5% to 70% nickel, and the remainder further comprises aluminum as the reactive molten metal.

Yet another embodiment of the present invention comprises the immersion of a sacrificial ceramic preform in the molten bath comprising 5% to 70% by weight copper, 5% to 70% by weight nickel, and 5% to 70% by weight silver, with the remainder of the molten bath being aluminum or an aluminum alloy.

Still another example of the present invention is the immersion of a sacrificial ceramic preform in a molten bath comprising 5% to 70% by weight zinc, 5% to 70% by weight nickel, and the remainder of the bath comprising molten aluminum.

The composite articles of the above embodiments have remarkably low reactivity toward oxidation, or corrosion. Thus, the present invention presents a method for improving the corrosion resistance of metal/ceramic composites.

It is to be noted that the 85Cu/15Al composite produced by the present invention exhibited refined or smaller scale microstructure by a factor of 10 relative to the microstructure of the Al composites produced according to the U.S. Pat. No. 5,214,011 process. This reduced microstructure is generally known to translate to improved mechanical properties. Thus, the present invention presents a method for improving mechanical properties in metal/ceramic composites.

In addition, the articles produced by the present invention exhibit increased wear resistance due to the unique incorporation of the high content of relatively inert metal or metals. In addition, the articles of the present invention will have longer wear life or practical utility because of the reduced corrosion susceptibility and the increased wear resistance.

EXAMPLE 1

A silica glass ($SiO_2$) preform of one (1) cm diameter was immersed into a molten bath of approximately 85% by weight of copper (the inert metal) and 15% by weight aluminum (the reactive metal) and held at about 1100° C. for about eight hours. After removal and clean up, a near net shape metal-ceramic composite was produced which comprised a fine alumina continuous phase with a continuous metal phase of copper/aluminum alloy. The composite article exhibited excellent corrosion and wear resistance, which was significantly improved relative to the wear and corrosion resistance of prior art alumina-aluminum composites.

EXAMPLE 2

A silica glass ($SiO_2$) preform of one (1) cm size was immersed into a molten bath of approximately 75% by weight of copper (the inert metal) and 25% by weight aluminum (the reactive metal) and held at about 1100° C. for about eight hours. After removal and clean up, a near net shape metal-ceramic composite was produced which comprised a fine alumina continuous phase with a continuous metal phase of copper/aluminum alloy.

EXAMPLE 3

A silica glass ($SiO_2$) preform of one (1) cm size was immersed into a molten bath of approximately 50% by weight of copper (the inert metal) and 50% by weight aluminum (the reactive metal) and held at about 1100° C. for about eight hours. After removal and clean up, a near net shape metal-ceramic composite was produced which comprised a fine alumina continuous phase with a continuous metal phase of copper/aluminum alloy.

The materials prepared by the present invention will be useful in high temperature components, electronic packaging materials, ceramic filters, conducting ceramics, and magnetic ceramic filters, conducting ceramics, and magnetic ceramics. It is also expected that the materials of the present invention will be useful in automotive engine and brake components, metal working dies, wear resistant and mining components, armor, cutting tools, sporting goods such as golf clubs and ice skate blades, grinding and abrading tools, cutlery and flatware, composite components including metal matrix composites and dual scale composites. Additionally, useful articles can be prepared by the present invention in the form of airframes, prosthetic devices and components, surface coating and impeller and pump components.

Other advantages and utilities of the present invention will become apparent to those skilled in the art. While certain preferred embodiments of the present invention have been disclosed in detail, it is to be understood that various modifications, equivalent structures and chemical compounds, and structural and chemical equivalents may be adopted without departing from the spirit of the invention or the scope of the following claims.

That which is claimed is:

1. A non-vapor method to produce microstructural grain size reduction in a metal/ceramic composite comprising the steps:

(a) mixing a reactive molten metal or molten metal mixture with at least one inert metal selected from the group consisting of copper, iron, cobalt, nickel, silver, gold, platinum, palladium, titanium, zinc, cadmium, tin, germanium, and lead to form a molten bath;

(b) contacting with the molten bath a sacrificial ceramic body, wherein the reactive molten metal or metal alloy is at a temperature above its melting point but below the softening point of the ceramic body, whereby a metal/ceramic composite article is formed in which the microstructural scale of the grain sizes is smaller than conventional composites not incorporating one or more inert metals.

2. The method of claim 1, wherein the molten bath contains about 40 to about 98% by weight inert metal and about 2 to about 60% by weight reactive metal.

3. The method of claim 1, wherein the sacrificial ceramic body is a material selected from the group consisting of silica, sand, wollastonite, mullite, silicate glass, fluorosilicate glass, fluoroborosilicate glass, aluminosilicate glass, calcium silicate glass, calcium aluminum silicate glass, calcium aluminum fluorosilicate glass, zinc oxide, copper oxide, chromium oxide, nickel oxide, titania, titanium carbide, magnesia, zirconia, zirconium carbide, zirconium nitride, silicon carbide, or silicon nitride, metal sulfides, and a mixture or combination thereof.

4. The method of claim 1, wherein the reactive molten metal is selected from the group consisting of aluminum, iron, cobalt, an aluminum alloy, hafnium, magnesium, niobium, titanium, tungsten, tantalum, yttrium, zirconium, and mixtures thereof.

5. The method of claim 1, wherein the reactive molten metal is aluminum or an aluminum mixture comprising one or more of the metals selected from the group consisting of iron, cobalt, magnesium, titanium, tantalum, tungsten, yttrium, niobium, zirconium, and hafnium, and mixtures thereof.

6. The method of claim 1, wherein the ceramic body at least partially oxidizes the reactive metal to form a metal oxide ceramic component.

7. The method of claim 1, wherein the sacrificial ceramic body is at least partially reduced.

8. The method of claim 1, wherein the metal/ceramic composite produced possesses a near net shape relative to the shape of the sacrificial ceramic body.

9. The method of claim 1, wherein the inert metal is copper, nickel, or silver or mixtures comprising copper, or nickel or silver.

10. The method of claim 1, wherein the inert metal is nickel or mixtures thereof.

11. The method of claim 1, wherein the inert metal is copper or mixtures thereof.

12. The method of claim 1, wherein the inert metal is silver or mixtures thereof.

13. A metal/ceramic composite produced by the process of claim 1, wherein the reactive molten metal mixture contains about 40 to less than 95% by weight inert metal and greater than 5 to about 60% by weight of reactive metal.

14. A metal/ceramic composite produced by the process of claim 1, wherein the reactive molten metal mixture contains about 50% by weight of copper and about 50% by weight of aluminum and the resulting microstructural grain size is less than 0.5 microns.

15. A metal/ceramic composite produced by the process of claim 1, wherein the reactive molten metal mixture contains about 75% by weight of copper and about 25% by weight of aluminum and the resulting microstructural grain size is less than 0.2 microns.

16. A metal/ceramic composite produced by the process of claim 1, wherein the reactive molten metal mixture contains about 85% by weight of copper and about 15% by weight of aluminum and the resulting microstructural grain size is less than 0.1 microns.

* * * * *